Dec. 12, 1972     G. O. HUNTZINGER ET AL     3,706,089

LAMP FAILURE INDICATOR

Filed Sept. 7, 1971

INVENTORS.
Gerald O. Huntzinger &
BY    Norris J. Bassett

Paul Fitzpatrick
ATTORNEY

United States Patent Office

3,706,089
Patented Dec. 12, 1972

3,706,089
LAMP FAILURE INDICATOR
Gerald O. Huntzinger and Norris J. Bassett, Anderson, Ind., assignors to General Motors Corporation, Detroit, Mich.
Filed Sept. 7, 1971, Ser. No. 178,256
Int. Cl. G08b 21/00; H01h 61/04
U.S. Cl. 340—253 N
3 Claims

ABSTRACT OF THE DISCLOSURE

Apparatus for indicating when one of several electrical loads has ceased to draw current. Certain loads are energized through a first bimetal member and other loads are energized through a second bimetal member, the members being positioned so thermal forces generated therein move them in opposite directions. An insulating spacer member connecting the movable sections of the bimetal members prevents their movement until the forces become unequal. The bimetal members then move in the same direction until the one in which the greatest force is generated engages a contact member connected to an indicator device. Current drawn by the device tends to facilitate the electrical connection with the contact member.

---

This invention relates to apparatus for indicating when one of several electrical loads has ceased to draw current and, more particularly, to apparatus for indicating when one of several lamps has become inoperative.

In many types of equipment two or more lamps are simultaneously energized and it is desirable to advise the equipment operator when one of the lamps has become inoperative and ceases to draw current. For example, motor vehicles customarily employ two or four headlamps for lighting the roadway. While it is desirable that the operator of a vehicle having a burned out headlamp be promptly advised of this circumstance, apparatus which has heretofore been proposed for providing this function has not gained widespread acceptance. It is believed that a primary reason for this lack of acceptance is that prior proposals have tended to be so complex as to be both expensive to manufacture and relatively prone to failure after less than a satisfactory useful life.

It is therefore an object of this invention to provide apparatus for detecting when one of several electrical loads ceases to draw current by energizing certain of the electrical loads through a first bimetal member and the remainder of the electrical loads through a second bimetal member, the bimetal members being connected by insulating connecting member that prevents their movement so long as the current drawn by the electrical loads are at normal levels and allows their movement when failure of an electrical load reduces the current in one of the bimetal members, movement of the bimetal members effecting energization of an indicator device to advise of the failed electrical load.

It is another object of this invention to provide apparatus which employs bimetal members to monitor currents drawn by several electrical loads and which effects energization of an indicator device being energized through one of the bimetal members in such a fashion as to facilitate an electrical connection between the indicator device and the power source.

The foregoing and other objects and advantages will become apparent from the following description and accompanying drawings, in which.

Figure 1:
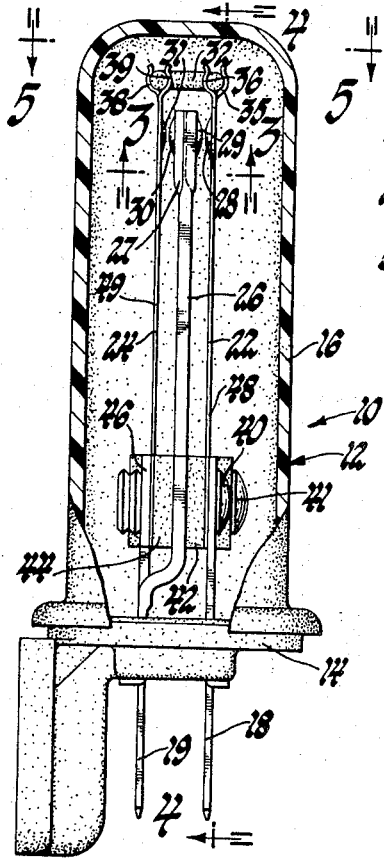
FIG. 1 is a side view, with parts broken away, of a detector unit incorporating the principles of the subject invention.

A detector unit 10 which embodies the principles of the subject invention is shown in FIG. 1 to include a housing 12 having base and cover sections 14 and 16 formed of an insulating material capable of withstanding temperatures from approximately —50° F. to temperatures of a few hundred degrees Fahrenheit. While the particular material employed in the housing 12 is not critical to this invention, satisfactory results have been obtained using a thermoplastic material as the housing 12. Among the materials which have been satisfactorily used is that known as Cirflex (a trademark) manufactured by the H. A. Wilson Division of Engelhard Industries in Union N.J.

Figure 2:
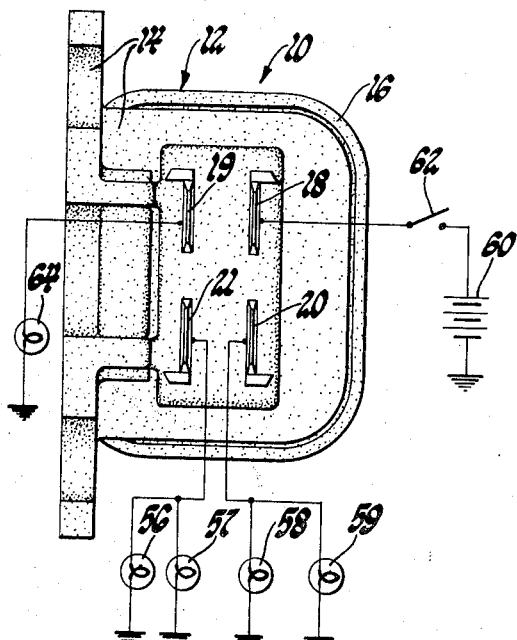
FIG. 2 is a schematic diagram illustrating the detector unit of FIG. 1 connected in a circuit to monitor lamp burnout among several lamps.

Several sturdy terminals 18 through 21 extend through the base 14, as best seen in FIG. 2, to support first and second bimetal members 22 and 24 and a contact member 26, which in the illustrated embodiment is an extension of the terminal 19 and is notched at 27. The bimetal members 22 and 24 in the illustrated embodiment are each of an elongated "U" shape that is inverted in the illustrated position in FIGS. 1 and 4, each end of the bimetal members 22 and 24 being securely supported by the terminals 18 through 21.

Figure 3:
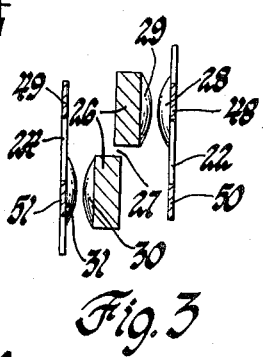
FIG. 3 is a sectional view of contacts employed in the detector unit of FIG. 1 viewed along the 3—3.

The center sections of the bimetal members 22 and 24 and the contact member 26 are provided with several electrical contacts 28 through 31, which are most clearly illustrated in FIG. 3. The contact member 26 is bent at each side of the notch 27 to prevent the bimetal members 22 and 24 from touching the contact member 26 other than through the contacts 28 through 31, which facilitate engagement between the contacts 28 through 31.

Figure 4:
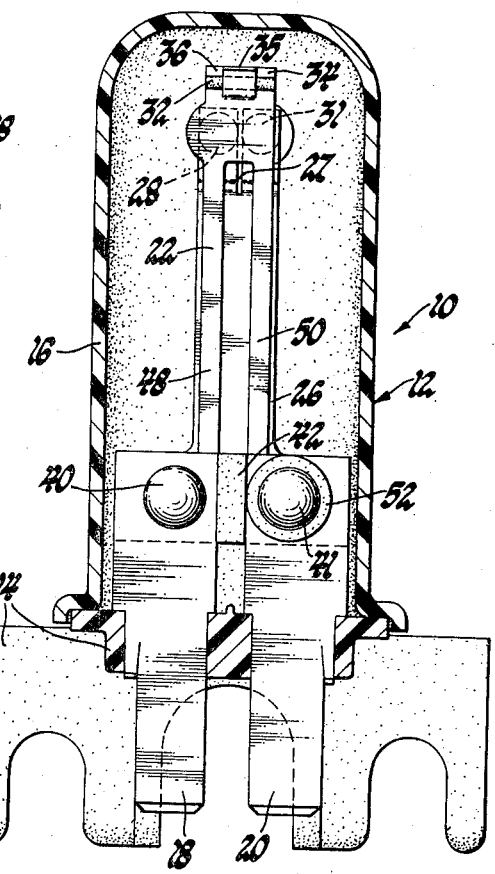
FIG. 4 is a front cross sectional view of the detector unit of FIG. 1, viewed along the line 4—4.

An insulating spacer member 32 of a configuration resembling an "h" is secured between several tangs 34 through 39 formed in the elevated center sections of the bimetal members 22 and 24. The tangs 34 through 39 are best illustrated in FIGS. 4 and 5 and are provided to maintain the unsecured upper sections of the bimetal members 22 and 24 in a predetermined spaced relationship.

Figure 5:
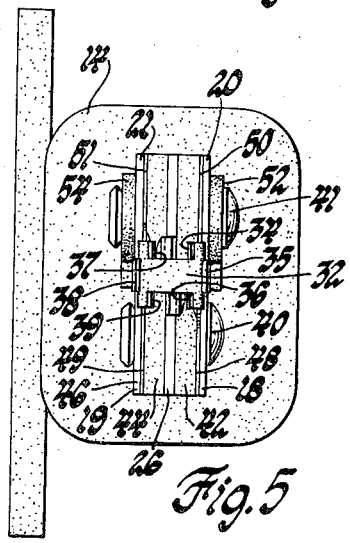
FIG. 5 is a top view of the detector unit of FIG. 1 with the detector unit cover removed.

The bimetal members 22 and 24 and the contact member 26 are secured to the terminals 18 through 21 by a pair of rivets 40 and 41, as best shown in FIG. 5, in a layered structure that includes first and second insulating layers 42 and 44 and a conductive backing plate 46. The first and second insulating members 42 and 44 are positioned on either side of the contact member 26 to assure electrical isolation between the bimetal members 22 and 24 and the contact member 26. The backing plate 46 is provided for facilitating the connection between the rivet 40 and the second bimetal member 40. Accordingly, the rivet 40 completes an electrical connection between the terminal 18, the backing plate 46, and the depending legs 48 and 49 of the respective first and second bimetal members 22 and 24. The other depending legs 50 and 51 of the respective first and second bimetal members 22 and 24 are insulated from the rivet 41 by insulating washers 52 and 54 and the insulating members 42 and 44. The depending leg 50 of the first bimetal member 42 is thus in electrical contact with the terminal 20 and the depending leg 51 of the second bimetal member 24 is in electrical contact with the terminal 21.

As shown in FIG. 2, the detector unit 10 may be employed to detect burnout of any one of several electrical loads represented by lamps 56 through 59. The lamps 56 through 59 are energized by a suitable power source, such as a vehicle battery 60, through the detector unit 10 when a light switch 62 is closed. When one of the lamps 56 through 59 is burned out it ceases to draw current. If this occurs, the detector unit 10 detects the lessened current being drawn by the lamps 56 through 59 and effects energization of an indicator lamp 64 to advise that one of the lamps 56 through 59 is extinguished, as will now be explained in the following operational description.

OPERATIONAL DESCRIPTION

When the light switch 62 is closed current from the battery 60 passes through the light switch 62, the terminal 18, the first bimetal member 22, and the terminal 20 to the lamps 58 and 59. Current also passes from the terminal 18 through the rivet 40, the backing plate 46, and the second bimetal member 24 to the lamps 56 and 57. All of the lamps 56 through 59 are thus normally energized by the battery 60 through the detector unit 10.

In the preferred embodiment the bimetal members 22 and 24 are selected to be similarly responsive to the passage of current through them and the lamps 56 through 59 are each selected to draw a certain current. The currents through the bimetal member 22 and 24 thus resistively heat them so as to generate internal stresses within the bimetal members 22 and 24. These stresses generate a predetermined force within each of the bimetal members 22 and 24 that tends to move the bimetal members 22 and 24 relative to the base 14. In the illustrated embodiment the bimetal members 22 and 24 are secured to the base 14 so these predetermined forces tend to move the bimetal members 22 and 24 toward each other and toward the contact member 26. However, the insulating spacer member 32 holds the bimetal members 22 and 24 in the predetermined spaced relationship such that neither of them can move when these predetermined forces are equal. The bimetal members 22 and 24 thus remain substantially motionless and the contacts 28 through 31 remain separated so long as all the lamps 56 through 59 draw current.

In the event one of the lamps 56 through 59 burns out it ceases to draw current through the bimetal member 22 or 24 in series with the burned out lamp. For example, when the lamp 59 burns out the current through the second bimetal member 24 to the lamp 56 and 57 remains constant but the current through the first bimetal member 22 is decreased as its current is only that drawn by the lamp 58. Since the resistive heating in the second bimetal member 24 is greater than the resistive heating in the first bimetal member 22, the force generated in the second bimetal member 24 is greater than the force generated in the first bimetal member 22. These unequal forces cause the bimetal members 22 and 24 and the spacer member 32 to flex on the base 14 in a clockwise direction from that illustrated in FIG. 1. This movement keeps the contacts 28 and 29 open but causes closure of the contacts 30 and 31.

Upon closure of the contacts 30 and 31 a current path is completed from the terminal 18 through the rivet 40, the backing plate 46, the depending leg 49 of the second bimetal member 24, the contacts 30 and 31, the contact member 26, and the terminal 19 to the indicator lamp 64. The indicator lamp 64 is thus energized upon failure of the lamp 59. As persons versed in the art will appreciate, failure of the lamp 58 will also effect energization of the indicator lamp 64 in a manner just described.

Should either of the other lamps 56 or 57 be burned out there will be a corresponding decrease in the current through the second bimetal member 24. When this occurs the force generated in the first bimetal member 22 exceeds that in the second bimetal member 24 so the bimetal members 22 and 24 move counterclockwise in a direction opposite that just described so as to close the contacts 28 and 29. Closure of the contacts 28 and 29 connects the terminal 18 through the depending leg 48 of the first bimetal member 42 and the contact member 26 to the indicator lamp 64. It is thus apparent that the indicator lamp 64 becomes energized whenever one of the lamps 56 through 59 ceases to draw current.

As persons versed in the art will appreciate, the bimetal members 22 and 24 may also be physically reversed in their illustrated positions so that current passing through the bimetal members 22 and 24 generates the predetermined forces within the bimetal members 22 and 24 directed opposite to that just described. By doing so, the insulating spacer member 32 is held in tension and upon failure of one of the lamps 56 through 59 the bimetal member 22 or 24 in which the greater force is generated will pull the other bimetal member 22 or 24 toward the contact member 26. While this modification of the illustrated embodiment may in some instances be preferred to that just described, it should be noted that an important advantage is provided by the just described apparatus.

That is, when the insulating spacer member 32 is held in compression while the lamps 56 through 59 are operative, the bimetal member 22 or 24, which is not in series with a failed lamp is the one which moves toward the contact member 26. For example, upon failure of the lamp 59 the second bimetal member 24 moves toward the contact member 26 so as to close the contacts 30 and 31. Accordingly, when the indicator lamp 64 is energized it draws additional current through the depending leg 49 of the second bimetal member 24. This additional current causes yet additional resistive heating within the depending leg 49 so as to increase the force generated in the second bimetal member 24. This increased force tends to facilitate completion of the electrical connection through the contacts 30 and 31 by pressing the contact 31 more tightly against the contact 30. A form of positive thermal feedback is thus provided when the bimetal members 22 and 24 hold the insulating spacer member in compression.

On the other hand, if the bimetal members 22 and 24 hold the insulating spacer 32 in tension, the current drawn by the indicator lamp 64 passes through the depending leg of the bimetal member 22 or 24 in series with a failed lamp. The current drawn by the indicator lamp 64 under these circumstances would tend to lessen the force pressing the contacts 28 and 29 or 30 and 31 together. Indeed, the current drawn by the indicator lamp 64 may be made so large as to cause the contacts 28 and 29 or 31 and 30 to open soon after they are closed. Since the failed lamp would not draw current the contacts 28 and 29 or 30 and 31 would thereafter intermittently close and open so as to effect intermittent energization of the indicator lamp 64. It is thus apparent that the detector unit 10 may be employed to either continuously or intermittently energize the indicator lamp 64 when one of the lamps 56 through 59 has failed, though continuous energization is believed preferable.

While it has been suggested that the lamps 56 through 59 each draw a certain current and that the current through the bimetal members 22 and 24 are equal when all of the lamps 56 through 59 are operative, persons versed in the art will appreciate that these are merely illustrative of but one embodiment of the subject invention. It is the function of the detector unit 10 to maintain the contacts 28 through 31 open so long as the monitored lamps 56 through 59 draw current and to close a set of contacts 28 and 29 or 30 and 31 when one of the lamps 56 through 59 is inoperative. Accordingly, it is only necessary that the predetermined forces within the bimetal members 22 and 24 are equal when the lamps 56 through 59 are operative and unequal when one of the lamps 56 through 59 has failed. The detector unit 10 may therefore readily be modified to monitor or to monitor failure of lamps drawing unequal amounts of current or failure of an odd number of lamps.

For example, if the lamps 56 and 57 draw a greater current than the lamps 58 and 59 the resistance in either of the bimetal members 22 or 24 may be modified by changing its cross section so as to establish the force generated within the modified bimetal member 22 or 24 at an amount equal to the force generated by resistive heating within the unmodified bimetal member 22 or 24. By so doing, the forces generated within the bimetal members 22 and 24 may be kept equal and the contacts 28 through 31 are kept open so long as all of the lamps 56 through 59 are operative. When one of the lamps 56 through 59 has failed these forces will be sufficiently unequal to effect energization of the indicator lamp 64 in the manner previously described.

Similarly, the detector unit 10 may be modified to monitor an odd number of lamps by modifying one of the bimetal members 22 or 24. For example, if the detector unit 10 is only employed to monitor the operativeness of the lamps 56 through 58, the lamp 59 being deleted from the circuit of FIG. 2, the current drawn through the second bimetal member 20 will be twice the current drawn through the first bimetal member 22 by the lamp 58. Accordingly, either of the bimetal members 22 or 24 may be modified, as by changing its cross section or metallurgical composition, so these unequal currents passing through the bimetal members 22 and 24 generate equal forces within the bimetal members 22 and 24 so long as all the lamps 56 through 58 are operative. Failure of one of the lamps 56 through 58 will thus effect energization of the indicator lamp 64 in the manner heretofore described.

It is thus apparent that the foregoing and other modifications may be made in the subject invention without departing from its spirit.

We claim:

1. Apparatus for indicating when one of several current loads ceases drawing current comprising, in combination, a support member; first conductive means mechanically responsive to current therethrough secured to the support member, the unsecured sections of said first conductive means moving in a first direction relative to the support member as said first conductive means is resistively heated by current therethrough; second conductive means mechanically responsive to current therethrough secured to the support member, the unsecured sections of said second conductive means moving in a direction opposite said first direction when said second conductive means is resistively heated by current therethrough; insulating spacer means connecting the first and second conductive means for maintaining said first and second conductive means in a predetermined spaced relation; means for connecting a power source in series with the first conductive means and certain of the current loads so as to cause a certain current in said first conductive means when said current loads each draw current whereby a predetermined force tending to move said first conductive means in said first direction is generated within said first conductive means; means for connecting the power source in series with the second conductive means and certain other of the current loads so as to cause a certain current in said second conductive means when said other current loads each draw current whereby a predetermined force tending to move said second conductive means in said opposite direction is generated within said second conductive means, the predetermined forces in the first and second conductive means being substantially equal when the certain currents pass through the respective first and second conductive means; a contact member positioned to engage at least one of the conductive means when the forces generated by resistive heating in said conductive means are substantially unequal; and means for connecting the contact member to an indicator device whereby said contact member and said one conductive means connect said indicator device in series with the power source when the forces in said first and second conductive means are substantially unequal, the indicator device thereby being energized by the power source to indicate that one of said current loads has ceased to draw current through one of said conductive means.

2. Apparatus for indicating when one of several electrical loads ceases drawing current comprising, in combination, a support member; a first bimetal member having two ends each of which is secured to the support member whereby passage of current through the first bimetal member generates forces tending to move the portion of the first bimetal member between said secured ends in a first direction relative to the support member; a second bimetal member having two ends each of which is secured to the support member whereby passage of current through the second bimetal member generates forces tending to move the portion of the second bimetal member between said secured ends in a direction opposite the first direction; an insulating member connected between the bimetal members at a point between their respective ends for maintaining a predetermined spaced relation between the bimetal members; means for connecting a power source in series with the first bimetal member and certain of the electrical loads so as to cause a certain current in the first bimetal member whereby a predetermined force tending to move the first bimetal member in the first direction is generated; means for connecting the power source in series with the second bimetal member and certain other of the electrical loads so as to cause a certain current in the second bimetal member whereby a predetermined force tending to move the second bimetal member in said opposite direction is generated, the predetermined forces in the first and second bimetal members being substantially equal when the certain currents are present in the respective first and second bimetal members; a contact member positioned to make electrical contact with one of the bimetal members when the forces in the first and second bimetal members are substantially unequal, said one bimetal member being the bimetal member in which the greatest force is being generated; and means for connecting the contact member to an indicator device whereby said contact member and said one bimetal member connect said indicator device in series with the power source when the force generated in said one bimetal member is greater than the force generated in the other bimetal member, the indicator device thereby being energized by the power source to indicate that one of the electrical loads has ceased to draw current, the current drawn by the indicator device through said one bimetal member thereby tending to increase the force generated in said one bimetal member so as to facilitate completion of the electrical contact between said one bimetal member and the contact member.

3. Apparatus for detecting when one of several electrical loads has become inoperative and has ceased to draw current, comprising in combination, a support member; a first elongated bimetal member secured at least at one end to the support member whereby current through the first bimetal member generates a force tending to move the first bimetal member in a first direction relative to the support member; a second elongated bimetal member having at least one end secured to the support member so that current through the second bimetal member generates a force tending to move the second bimetal member in a direction opposite the first direction; an insulating member connected between the first and second bimetal members at a location at which the bimetal members are free to move relative to the support member so as to maintain the first and second bimetal members in a predetermined spaced relation; means for connecting the first bimetal member in series with certain of the electrical loads whereby said certain electrical loads are energized by the power source through the first bimetal member, said certain electrical loads drawing a certain current through the first bimetal member so as to generate a predetermined force within the first bimetal member tending to move the first bimetal member in the first direction; means for connecting the power source in series with the second bimetal member and certain other of the electrical loads, said other electrical loads drawing a certain current through the second bimetal member so as to generate a predetermined force within the second bimetal member tending to move the second bimetal member in said opposite direction, the predetermined forces in the first and second bimetal members being substantially equal when the certain currents are present in the respective first and second bimetal members; an elongated contact member rigidly secured substantially at one end to the support member and extending to a point at which the first and second bimetal members are free to move relative to the support member for completing an electrical connection with one of the bimetal members when the forces generated within the first and second bimetal members are substantially unequal, said one bimetal member being the bimetal member in which the greatest force is generated by current therethrough; and means for connecting the contact member to an indicator device whereby the contact member and said one bimetal member connect the indicator device in series with the power source when the force generated in said one bimetal member is greater than the force generated in the other bimetal member, the indicator device thereby being energized by the power source to indicate that one of the electrical loads has ceased to draw current, the current drawn by the indicator device passing through a substantial portion of said one bimetal member so as to generate an increased force within said one bimetal member to facilitate completion of the electrical connection between said one bimetal member and the contact member.

References Cited
UNITED STATES PATENTS

| | | | |
|---|---|---|---|
| 2,014,958 | 9/1935 | Wilhelm | 337—95 |
| 3,010,097 | 11/1961 | Boddy | 340—213 R |
| 3,207,872 | 9/1965 | Nauer | 337—95 XR |
| 3,293,489 | 12/1966 | Marshall | 315—82 XR |
| 3,454,941 | 7/1969 | Voorman, Jr. | 340—251 |
| 3,509,417 | 4/1970 | Schmitt | 337—370 XR |

FOREIGN PATENTS

| | | | |
|---|---|---|---|
| 797,593 | 7/1958 | Great Britain | 337—95 |

JOHN W. CALDWELL, Primary Examiner

D. MYER, Assistant Examiner

U.S. Cl. X.R.

73—363.3; 337—95, 335; 340—251, 213 R